(12) United States Patent
Hinata et al.

(10) Patent No.: US 12,416,767 B2
(45) Date of Patent: Sep. 16, 2025

(54) DEVICE FOR PRODUCING OPTICAL CONNECTOR AND METHOD FOR PRODUCING OPTICAL CONNECTOR

(71) Applicant: Enplas Corporation, Saitama (JP)

(72) Inventors: Ayano Hinata, Saitama (JP); Takayuki Sukegawa, Saitama (JP)

(73) Assignee: Enplas Corporation, Saitama (JP)

( * ) Notice: Subject to any disclaimer, the term of this patent is extended or adjusted under 35 U.S.C. 154(b) by 46 days.

(21) Appl. No.: 18/180,403

(22) Filed: Mar. 8, 2023

(65) Prior Publication Data

US 2023/0288645 A1 Sep. 14, 2023

(30) Foreign Application Priority Data

Mar. 10, 2022 (JP) ................. 2022-037185

(51) Int. Cl.
*G02B 6/38* (2006.01)
(52) U.S. Cl.
CPC ........... *G02B 6/3861* (2013.01); *G02B 6/385* (2013.01)

(58) Field of Classification Search
CPC .............................. G02B 6/3861; G02B 6/385
See application file for complete search history.

(56) References Cited

U.S. PATENT DOCUMENTS

2016/0282576 A1    9/2016   Nishimura
2017/0082811 A1*   3/2017   Kadoya .................... G02B 6/42

FOREIGN PATENT DOCUMENTS

JP      2016-180946 A    10/2016

* cited by examiner

*Primary Examiner* — Nirvana Deonauth
(74) *Attorney, Agent, or Firm* — Shih IP Law Group, PLLC

(57) ABSTRACT

An optical connector production device of the present invention is configured to produce an optical connector that includes a ferrule and a first optical transmission member. The production device includes a jig body, and a fixing part which allows the ferrule to fit thereto to hold the ferrule and which is disposed in the jig body.

4 Claims, 9 Drawing Sheets

DEVICE FOR PRODUCING OPTICAL CONNECTOR AND METHOD FOR PRODUCING OPTICAL CONNECTOR

CROSS REFERENCE TO RELATED APPLICATIONS

This application is entitled to and claims the benefit of Japanese Patent Application No. 2022-037185, filed on Mar. 10, 2022, the disclosure of which including the specification, drawings and abstract is incorporated herein by reference in its entirety.

TECHNICAL FIELD

The present invention relates to a device for producing an optical connector and a method for producing an optical connector.

BACKGROUND ART

A ferrule with an optical transmission member (for example, an optical fiber or an optical waveguide) disposed therein is known. A ferrule with an optical transmission member disposed therein serves as an optical connector and is used to achieve an optical connection.

Patent Literature (hereinafter, referred to as PTL) 1, for example, discloses an optical connector (ferrule) including a substrate and an optical transmission member. The optical connector (ferrule) includes a main body and two positioning pins. The optical connector is used to transmit optical signals to and from the substrate.

CITATION LIST

Patent Literature

PTL 1

Japanese Patent Application Laid-Open No. 2016-180946

SUMMARY OF INVENTION

Technical Problem

For producing an optical connector including a ferrule and an optical transmission member, the ferrule is held by a jig, and the optical transmission member is appropriately disposed relative to the held ferrule. However, ferrules have become smaller in recent years. It has thus become difficult to hold a ferrule in a jig, and when the ferrule is held forcibly, the ferrule may be dented or scratched.

An object of the present invention is to provide a device for producing an optical connector (herein also referred to as "optical connector production device") capable of easily holding a ferrule and reducing the possibility of a dent or a scratch on the ferrule. Another object of the present invention is to provide a method which is for producing an optical connector and which uses the optical connector production device.

Solution to Problem

An optical connector production device of the present invention is configured to produce a first optical connector that includes a first ferrule and a first optical transmission member, the production device including: a jig body; and a fixing part for allowing the first ferrule to fit thereto to hold the first ferrule, the fixing part being disposed in the jig body.

A method for producing an optical connector of the present invention uses the production device described above, the method including: holding the ferrule in the fixing part; and disposing one end of the first optical transmission member on the ferrule held by the fixing part.

Advantageous Effects of Invention

The present invention can produce an optical connector without denting or scratching a ferrule even when the ferrule is small. In addition, the present invention can evaluate the positional accuracy of the end of a first optical transmission member during the production of the optical connector.

DESCRIPTION OF EMBODIMENTS

Optical Connector being Produced by Production Device

Figure 1A:
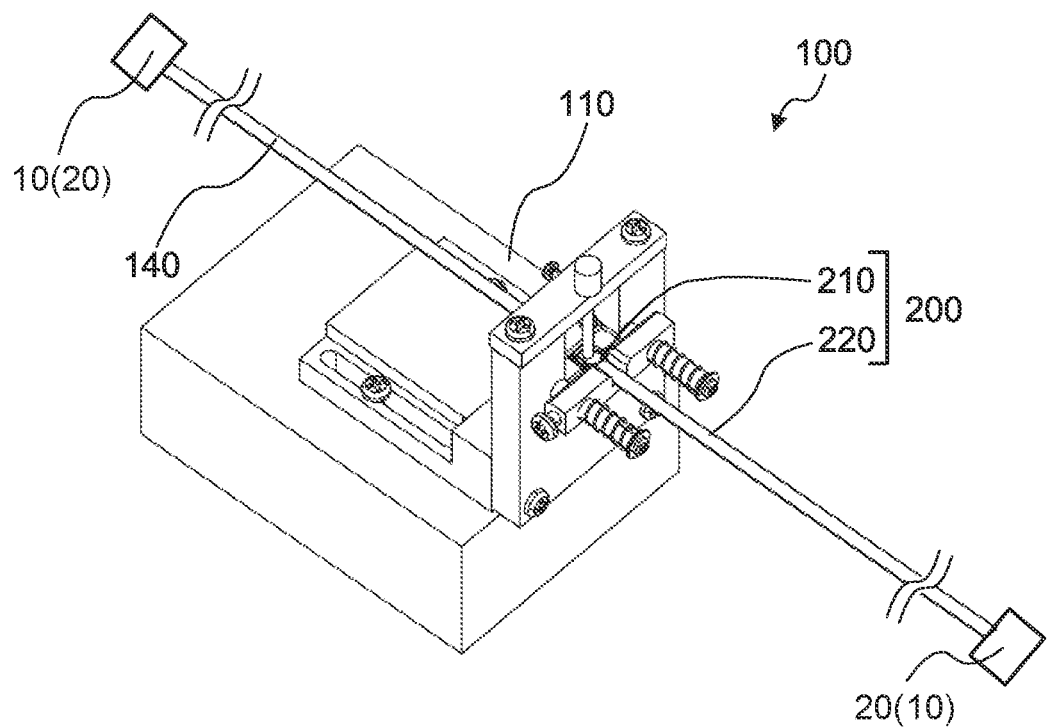
FIG. 1A is a perspective view illustrating an optical connector being produced by using a production device according to an embodiment of the present invention.
Figure 1B:
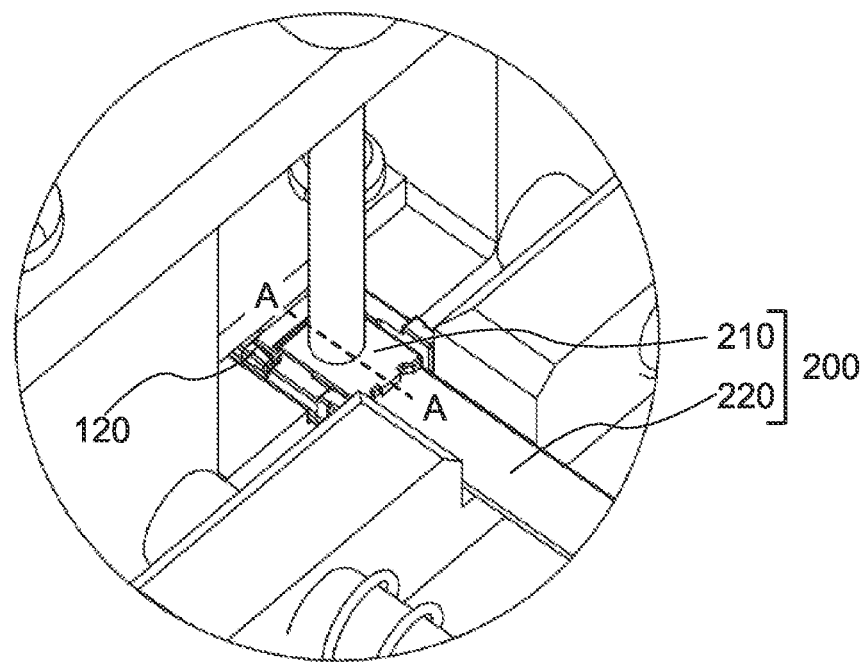
FIG. 1B is an enlarged view of part of FIG. 1A.

FIG. 1A illustrates optical connector 200 according to an embodiment of the present invention being produced by using production device 100 that is configured to produce optical connector 200. FIG. 1B is an enlarged view of part of FIG. 1A.

In production device 100 of the present embodiment, first ferrule 210 is held by fitting first ferrule 210 in fixing part 120, and first optical transmission members 220 are disposed on the held first ferrule 210 and fixed, thereby producing optical connector 200, as illustrated in FIGS. 1A and 1B.

Figure 2A:
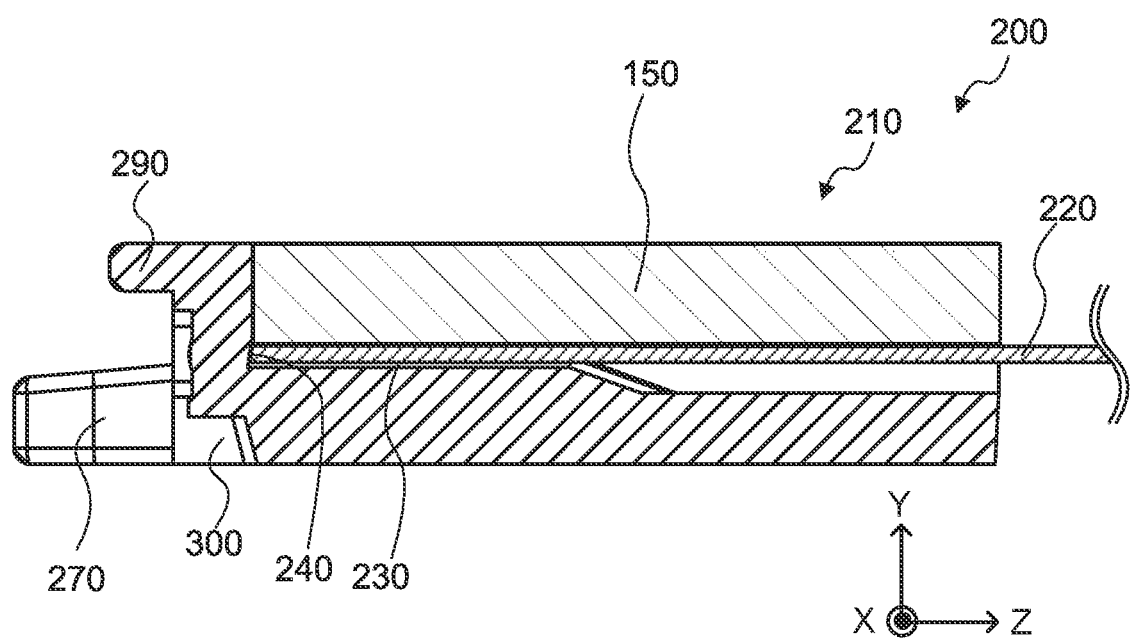
FIG. 2A is a cross-sectional view of the optical connector.
Figure 2B:
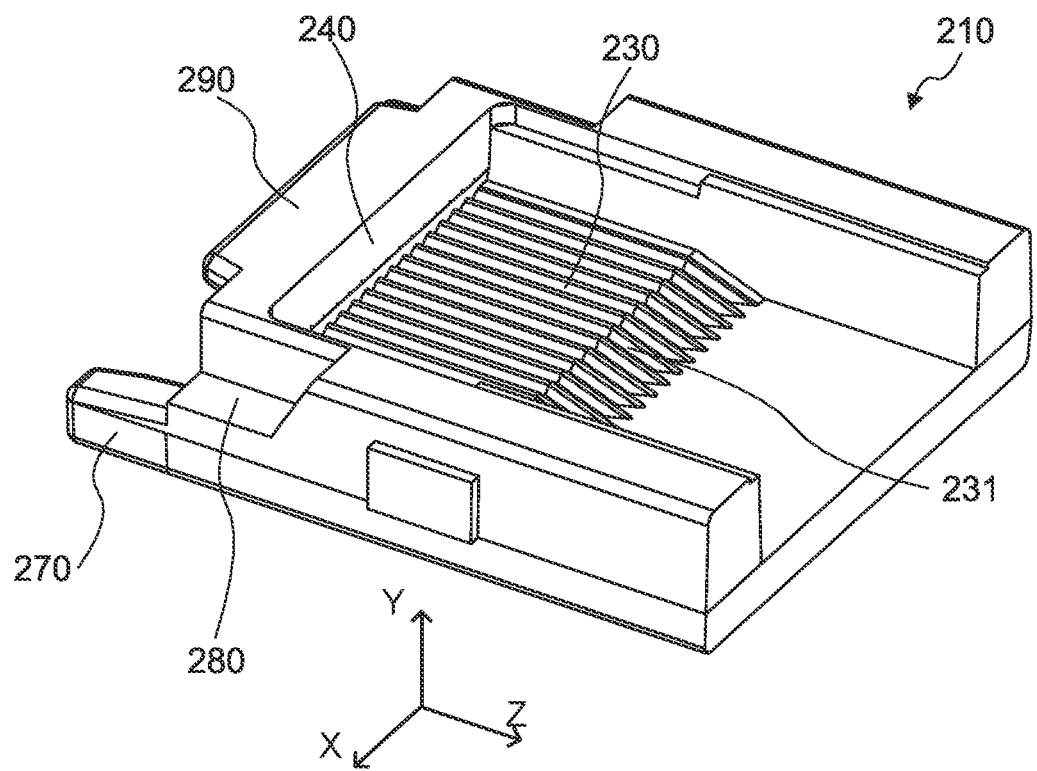
FIG. 2B is a perspective view of a ferrule.

FIG. 2A is a cross-sectional view of optical connector 200 taken along line A-A of FIG. 1B. As illustrated in FIG. 2A, first optical transmission members 220 are disposed between optical transmission member holding part 230 and lid 150, and fixed in first ferrule 210. Optical connector 200 is thus produced. As illustrated in FIG. 1A, one of light emitting device 10 and light receiving device 20 is optically connected to the end of second optical transmission members 140 connected to fixing part 120, and the other one of light emitting device 10 and light receiving device 20 is optically connected to the end of the first optical transmission members 220 fixed to first ferrule 210. Using production device 100 thus can evaluate whether or not first optical transmission members 220 are optically connected with second optical transmission members 140 during the production of optical connector 200. In other words, evaluating the optical coupling of first optical transmission members 220 can evaluate whether or not the end of first optical transmission members 220 are correctly disposed with respect to first ferrule 210. The detail of such a configuration will be described below. FIG. 1A illustrates light emitting device 10 and light receiving device 20 separated from production device 100; however, light emitting device 10 and/or light receiving device 20 may be integral with production device 100. In other words, production device 100 may include light emitting device 10 and/or light receiving device 20.

Examples of first optical transmission member 220 and second optical transmission member 140 include optical fibers and optical waveguides. In the present embodiment, first optical transmission member 220 and second optical transmission member 140 are optical fibers. In the present embodiment, a plurality of optical fibers are bundled in a row by a covering part to have a ribbon shape.

Configuration of Ferrule

The following describes a configuration of first ferrule 210 at which first optical transmission members 220 are disposed, thereby serving as optical connector 200.

Figure 3A:
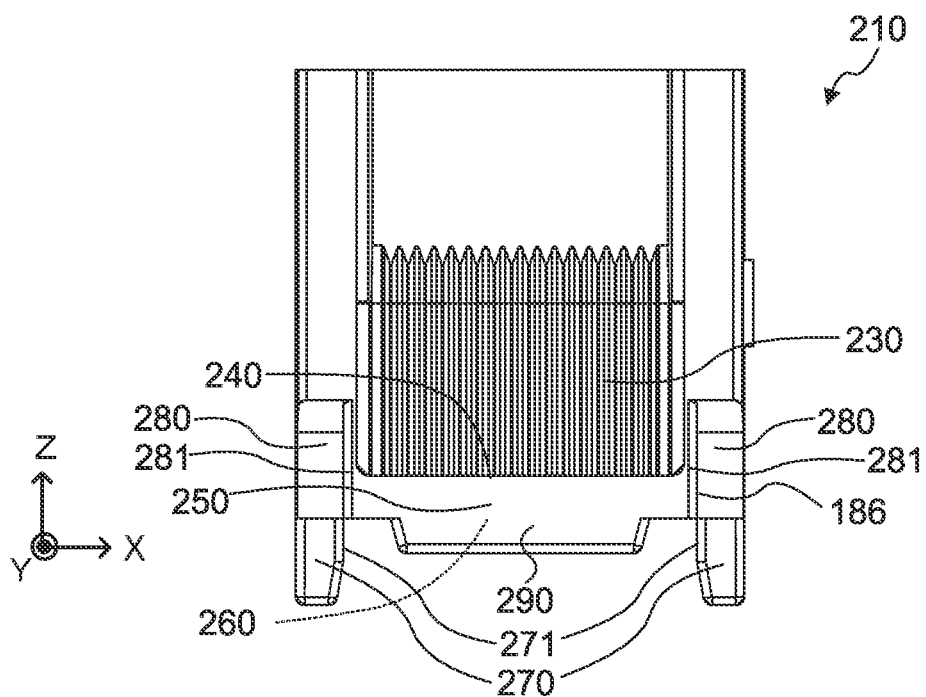
FIG. 3A is a plan view of the ferrule.
Figure 3B:
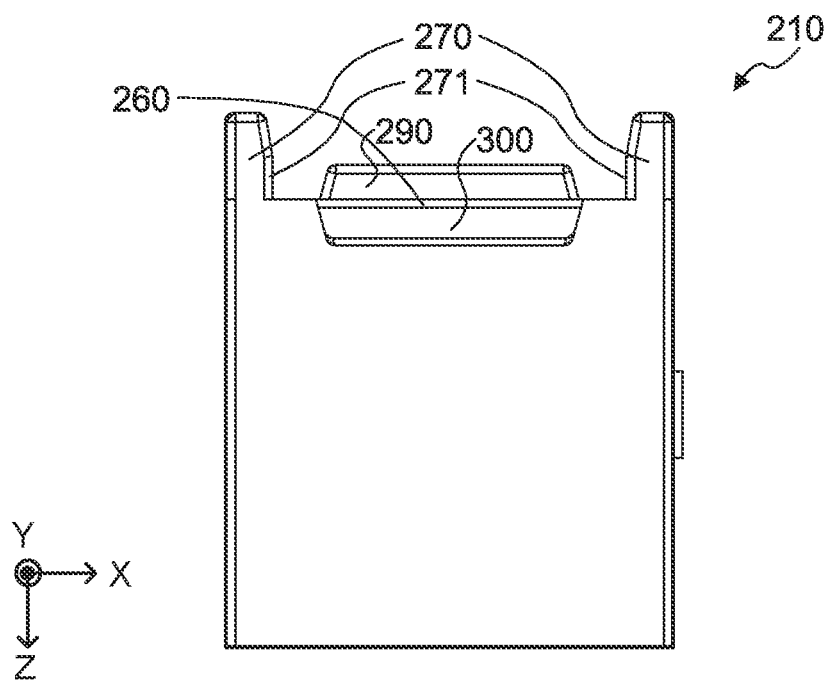
FIG. 3B is a bottom surface view of the ferrule.
Figure 4A:
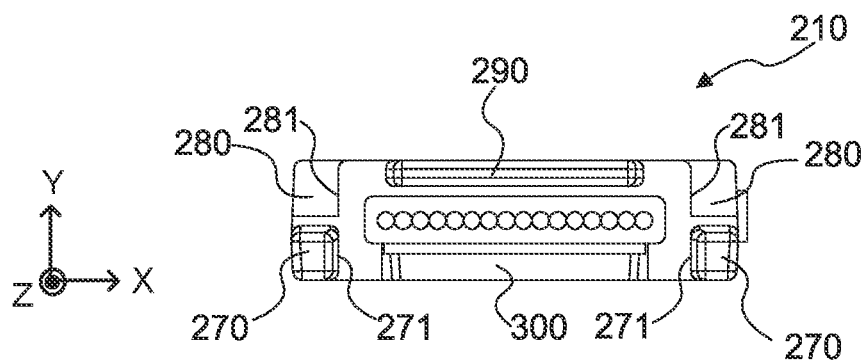
FIG. 4A is a front view of the ferrule.

FIG. 3A is a plan view of first ferrule 210 at which first optical transmission members 220 are disposed, thereby serving as optical connector 200. FIG. 3B is a bottom surface view of first ferrule 210. FIG. 3A illustrates first ferrule 210 without lid 150. FIG. 4A is a front view of first ferrule 210, FIG. 4B is a rear view of the ferrule, FIG. 4C is a left side view of the ferrule, and FIG. 4D is a right side view of the ferrule.

As illustrated in FIGS. 3A to 4D, first ferrule 210 has a substantially cuboid shape. In addition, in the present embodiment, first ferrule 210 includes optical transmission member holding part 230, first optical surface 240, light transmitting wall 250, second optical surfaces 260, engaging protrusions 270, engaging recesses 280, protrusion 290, recess 300, and lid 150, as illustrated in FIGS. 3A to 4D. The configurations of these components will be described below.

Figure 4B:
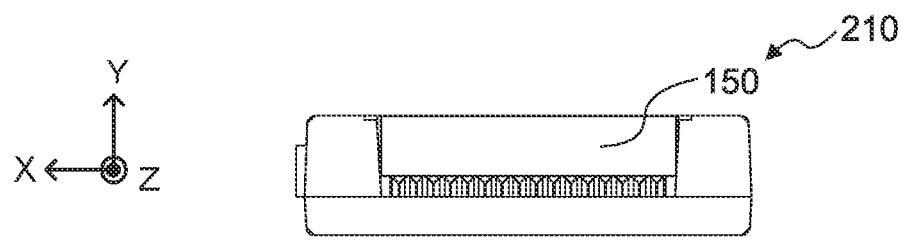
FIG. 4B is a rear view of the ferrule.
Figure 4C:
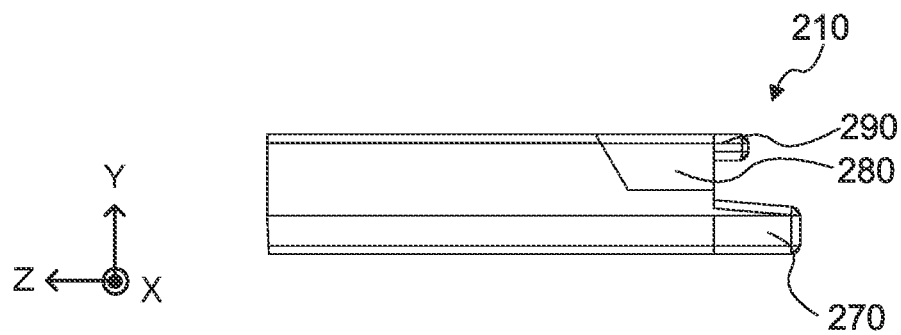
FIG. 4C is a left side view of the ferrule.
Figure 4D:
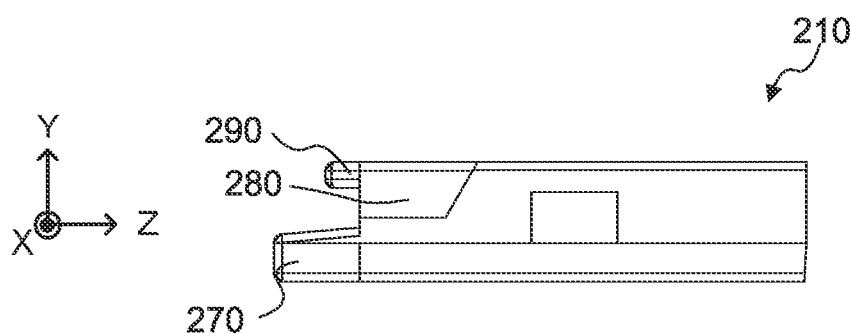
FIG. 4D is a right side view of the ferrule.

In the following description, the direction along the bottom surface of first ferrule 210 when first ferrule 210 is viewed from the front and rear is defined as "X direction" as illustrated in FIGS. 4A and 4B. A direction orthogonal to the X direction is defined as "Y direction." "Y direction" is the direction (height direction) along the side surface when first ferrule 210 is viewed from the front and from the rear. "Z direction" is orthogonal to "X direction" and "Y direction." In other words, the direction along the bottom surface of first ferrule 210 when first ferrule 210 is viewed from the side is "Z direction," as illustrated in FIGS. 4C and 4D.

Optical transmission member holding part 230 is a portion that holds first optical transmission members 220. Optical transmission member holding part 230 may have any configuration as long as the holding part can hold first optical transmission members 220. In the present embodiment, optical transmission member holding part 230 includes grooves 231 where first optical transmission members 220 are disposed. Groove 231 extends perpendicularly to first optical surface 240 in plan view, as illustrated in FIG. 3A. Examples of grooves 231 include V-grooves and U-grooves. Grooves 231 are configured in such a way that when first optical transmission members 220 are disposed, the end surfaces of first optical transmission members 220 are appropriately disposed with respect to first optical surface 240. The number of grooves 231 may be appropriately set according to the number of first optical transmission members 220. In the present embodiment, the number of the grooves is 16.

Optical transmission member holding part 230 may include insertion holes, into which optical fibers are inserted, in place of the grooves. In an optical transmission member holding part including insertion holes, the insertion holes are configured in such a way that when first optical transmission members 220 are inserted, the end surfaces of first optical transmission members 220 are appropriately disposed with respect to first optical surface 240.

First optical surface 240 directly faces the end surfaces of first optical transmission members 220. First optical surface 240 has the following configuration: light from first optical transmission members 220 is incident on first optical surface 240, or light from second optical surfaces 260 is incident on and emitted from first optical surface 240 toward first optical transmission members 220. First optical surface 240 is disposed on light transmitting wall 250 at the surface opposite to second optical surfaces 260. In the present embodiment, the first optical surface is parallel to the XY plane.

Light transmitting wall 250 includes first optical surface 240 at one surface and second optical surfaces 260 at the other surface. Light transmitting wall 250 allows transmission of light from first optical surface 240 or second optical surfaces 260 incident on light transmitting wall 250.

Second optical surface 260 faces first optical surface 240. Second optical surface 260 has the following configuration: light from first optical surface 240 is incident on and emitted from second optical surface 260, or light emitted from another optical connector is incident on second optical surface 260. Second optical surface 260 may be a flat surface or a curved surface. In the present embodiment, second optical surface 260 is a curved surface, and more specifically, a convex lens. The number of second optical surfaces 260 may be appropriately set according to the number of optical transmission members 220 (optical fibers), and may be one or more than one. In the present embodiment, the number of second optical surfaces 260, which are convex lenses, is more than one in accordance with the number (that is more than one) of optical fibers.

Engaging protrusions 270 are a pair of members projecting in the Z direction and separated from each other to the left and right (separating in the X direction) when first ferrule 210 is viewed from the front, as illustrated in FIG. 4A. In addition, in the present embodiment, engaging protrusion 270 is disposed on the lower side (back surface side) when first ferrule 210 is viewed from the front. In the present embodiment, engaging protrusion 270 has a substantially cuboid shape elongated in the Z direction. Engaging protrusion 270 has a shape complementary to that of engaging recess 280, and the protrusion and the recess are configured to be able to engage (fit) with each other. In other words, engaging protrusion 270 is a portion that fits into engaging recess 280.

Specifically, engaging protrusion 270 includes inward restricting surface 271 in the present embodiment. Inward restricting surface 271 faces the inside of first ferrule 210 when first ferrule 210 is viewed from the front. Inward restricting surfaces 271 of the respective paired engaging protrusions 270 face each other in the X direction. This inward restricting surface 271 engages (fits) with outward restricting surface 281 of engaging recess 280. By engaging (fitting) the surfaces with each other, the movement of first ferrule 210 in the left-right direction (X direction) is restricted, thereby fixing the ferrule with respect to the left-right direction.

Engaging recesses 280 are portions recessed in the Z direction and separated from each other to the left and right (separating in the X direction) when first ferrule 210 is viewed from the front, as illustrated in FIG. 4A. In addition, in the present embodiment, engaging recess 280 is disposed on the upper side (top surface side) when the first ferrule is viewed from the front. In the present embodiment, engaging recess 280 has a substantially cuboid shape elongated in the Z direction. Engaging recess 280 has a shape complementary to that of engaging protrusion 270, and the recess and the protrusion are configured to be able to engage (fit) with each other. In other words, engaging recess 280 is a portion that fits with engaging protrusion 270.

Specifically, engaging recess 280 includes outward restricting surface 281 in the present embodiment. Outward restricting surface 281 faces the outside of first ferrule 210 when first ferrule 210 is viewed from the front. This outward restricting surface 281 engages (fits) with inward restricting surface 271 of engaging protrusion 270. By engaging (fitting) the surfaces with each other, the movement of first ferrule 210 in the left-right direction (X direction) is restricted, thereby fixing the ferrule with respect to the left-right direction.

Protrusion 290 is a portion that is disposed on the upper side (top surface side) when first ferrule 210 is viewed from the front, and protrudes in the Z direction. In the present embodiment, protrusion 290 has a substantially cuboid shape elongated in the X direction. Protrusion 290 has a shape complementary to that of recess 300. Protrusion 290 thus engages with (fits into) recess 300.

Recess 300 is a portion disposed on the lower side (back surface side) when first ferrule 210 is viewed from the front, and recessed in the Z direction. In the present embodiment, the recess has a substantially cuboid shape elongated in the X direction. Recess 300 has a shape complementary to that of protrusion 290. Recess 300 thus engages (fits) with protrusion 290. The engaged (fitted) protrusion 290 and recess 300 fix first ferrules 210 to each other with respect to the Y direction.

Figure 5:
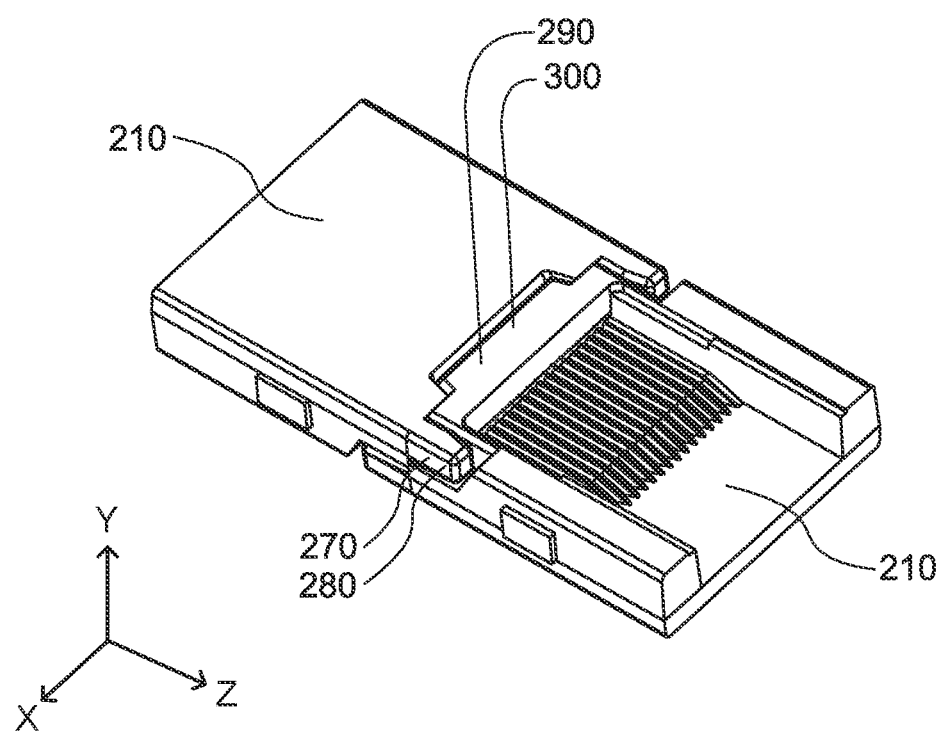
FIG. 5 illustrates a state in which the ferrules are coupled by fitting.

As described above, engaging protrusion 270 and engaging recess 280 are engaged (fitted) together, and protrusion 290 and recess 300 are engaged (fitted) together. Specifically, the engagement (fitting) is performed when the front surfaces of two ferrules 210 are put together while the top surface of one of the first ferrules faces up and the back surface of the other one of the first ferrules faces up, as illustrated in FIG. 5.

How first ferrules 210 are fitted together is not limited to the above description. Any manner may be used as long as first ferrules 210 can be fitted together. For example, one first ferrule may have a pin and the other first ferrule may have a hole for receiving the pin, thereby fitting the ferrules together.

Lid 150 is disposed on first optical transmission members 220 disposed at optical transmission member holding part 230, and holds first optical transmission members 220. Lid 150 is preferably fixed to first ferrule 210 with an adhesive. The type of adhesive is not limited. Examples of the adhesive include UV curable adhesives.

In the present invention, the first ferrule is not limited to first ferrule 210 described above, and the present invention is also applicable to ferrules having other configurations.

Production Device

In the following, production device 100 for producing optical connector 200 will be described.

Figure 6:
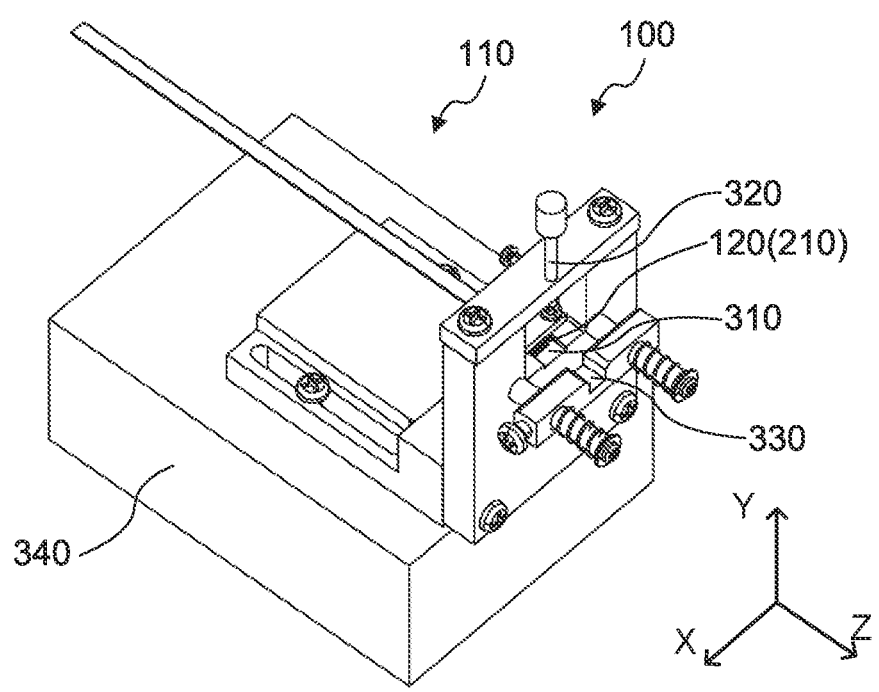
FIG. 6 is a perspective view of the production device.
Figure 7:
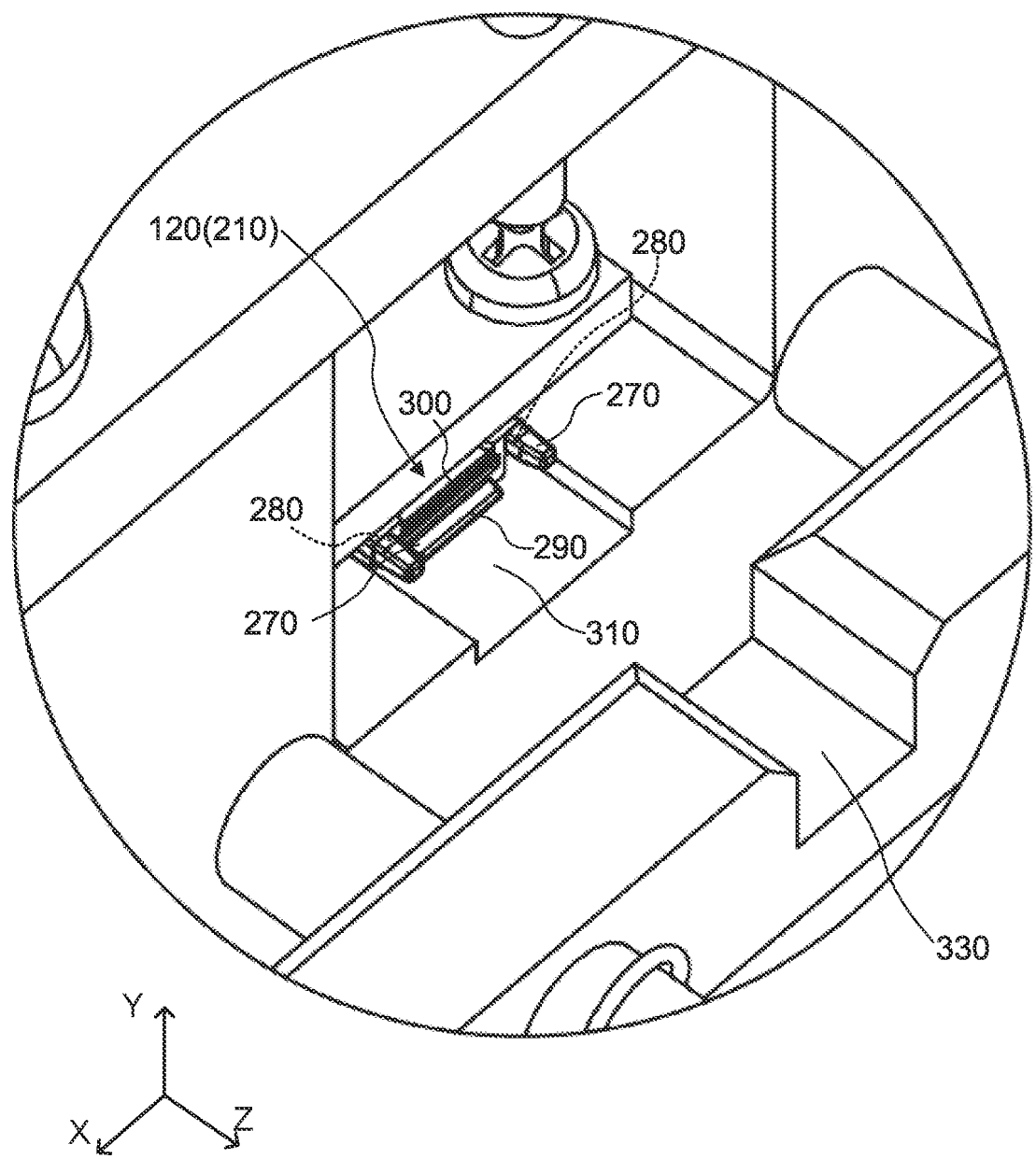
FIG. 7 is an enlarged view of part of FIG. 6.
Figure 8A:
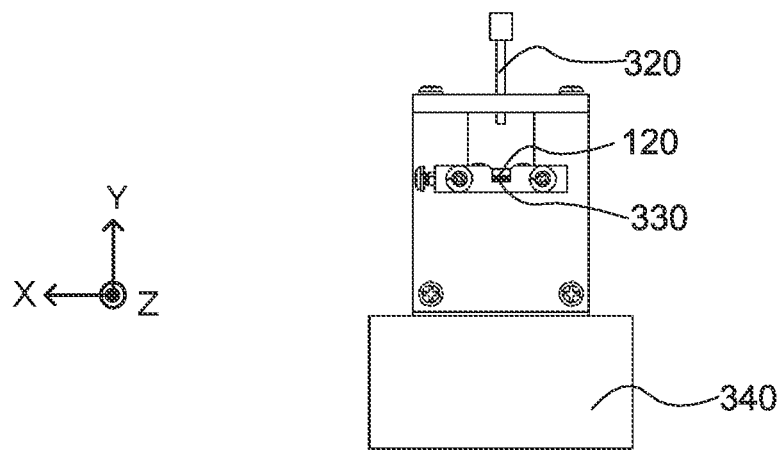
FIG. 8A is a front view of the production device.
Figure 8B:
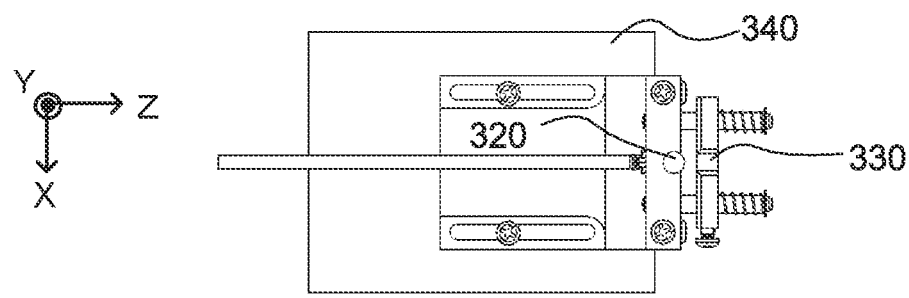
FIG. 8B is a plan view of the production device.
Figure 8C:
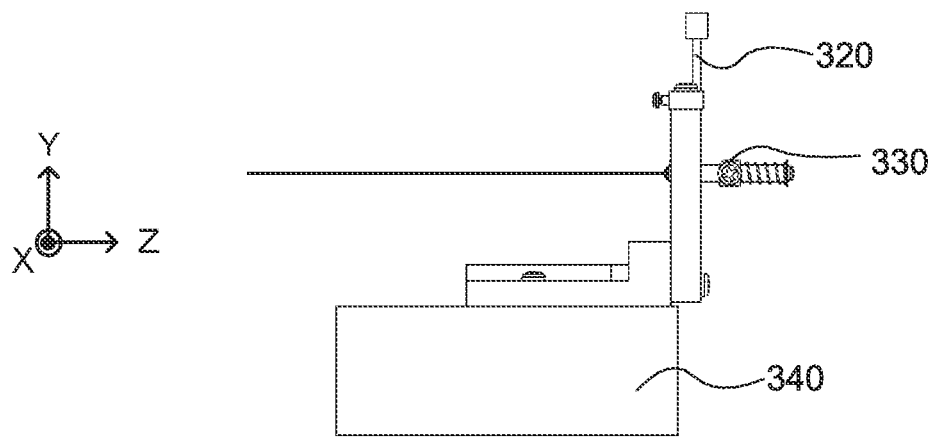
FIG. 8C is a left side view of the production device.

FIG. 6 is a perspective view of production device 100, and FIG. 7 is an enlarged view of part of FIG. 6. FIG. 8A is a front view of production device 100, FIG. 8B is a plan view of the production device, and FIG. 8C is a left side view of the production device.

As illustrated in FIG. 6, production device 100 includes jig body 110 and fixing part 120.

Fixing part 120 is a member for fitting first ferrule 210. Fixing part 120 is disposed in jig body 110. Fixing part 120 may be integrated with or separate from production device 100. Fixing part 120 may have any configuration as long as the fixing part is configured to hold first ferrule 210 by fitting. Fixing part 120 preferably holds first ferrule 210 by fitting with a fitting structure of the first ferrule. The fitting structure is configured to be used when first ferrule 210 is connected to another device (another ferrule). It is preferable that fixing part 120 can hold the front surface of first ferrule 210. Such a configuration enables fixing of an optical transmission member to first ferrule 210 by irradiating the top surface side or the back surface side of the first ferrule with UV light to cure the UV curable adhesive. The detail of such a configuration will be described below. In addition, the fitting structure of fixing part 120 can preferably be fitted so as to restrict the movement of first ferrule 210 in the XY directions.

In the present embodiment, fixing part 120 includes the following components which enable the fixing part to fit with first ferrule 210: engaging protrusions 270, engaging recesses 280, protrusion 290, and recess 300. In the present embodiment, first ferrule 210 itself is used as fixing part 120 having such a configuration (hereinafter, the first ferrule used as the fixing part is also referred to as "second ferrule"), as illustrated in FIG. 7. First ferrule 210 has a structure for fitting with another first ferrules 210 as illustrated in FIG. 5. First ferrule 210 thus can be used as fixing part 120. Therefore, first ferrule 210, where first optical transmission members 220 are disposed, can be easily and reliably held in production device 100, and the possibility of a dent or the like on first ferrule 210 can be reduced.

Jig body 110 may have any configuration as long as the jig body is configured to hold fixing part 120. In the present embodiment, jig body 110 includes base 340, ferrule supporting part 310, lid pressing member 320, and ferrule pressing member 330.

Base 340 has a substantially cuboid shape, as illustrated in FIGS. 6 and 8A to 8C. Fixing part 120, ferrule supporting part 310, lid pressing member 320, and ferrule pressing member 330 are disposed on or above base 340. Base 340 may be mounted in such a way that the base can move in the X, Y, and/or Z direction and/or rotatably mounted.

Ferrule supporting part 310 is a portion for supporting first ferrule 210 fitted to fixing part 120. More specifically, ferrule supporting part 310 supports first ferrule 210 from below so as to prevent first ferrule 210 held by fixing part 120 from moving downward and coming off fixing part 120 when first ferrule 210 is pushed from above by lid pressing member 320. In the present embodiment, ferrule supporting part 310 is a recess. The recess preferably has a Z-direction length that is equal to or greater than the Z-direction length of lid 150 of first ferrule 210 or equal to or greater than the Z-direction length of optical transmission member holding part 230 of first ferrule 210. A recess having such a length enables reliable pressing of lid 150 toward the first optical transmission member 220 side when first optical transmission members are disposed at first ferrule 210 held by fixing part 120 and then lid 150 is disposed thereon (see the cross-sectional view of FIG. 2A).

Lid pressing member 320 is a portion for pressing lid 150 (see FIG. 2A) of first ferrule 210 held by fixing part 120. Lid pressing member 320 may be disposed at any position above ferrule supporting part 310 as long as the member can press lid 150 of held first ferrule 210. In the present embodiment, lid pressing member 320 includes a rod-shaped member elongated in the Y direction. In addition, lid pressing member 320 is configured to be movable in the Y direction in the present embodiment. Any method may be used for configuring the lid pressing member to be movable in the Y direction. In the present embodiment, the surface of the rod-shaped member of lid pressing member 320 has threads, and rotating the rod-shaped member can move the member in the Y direction to press lid 150.

Ferrule pressing member 330 presses first ferrule 210 fitted to fixing part 120 toward fixing part 120 (in the Z direction). Further, the ferrule pressing member is a portion that supports first optical transmission members 220 disposed at ferrule 210. In the present embodiment, ferrule pressing member 330 includes a recess that supports the ribbon-shaped first optical transmission member 220. In addition, ferrule pressing member 330 is configured to be movable in the Z direction in the present embodiment.

Method for Producing Optical Connector

FIGS. 9A to 9E illustrate a method for producing optical connector 200. In the following, a method for producing optical connector 200 will be described with reference to the drawings.

Figure 9A:
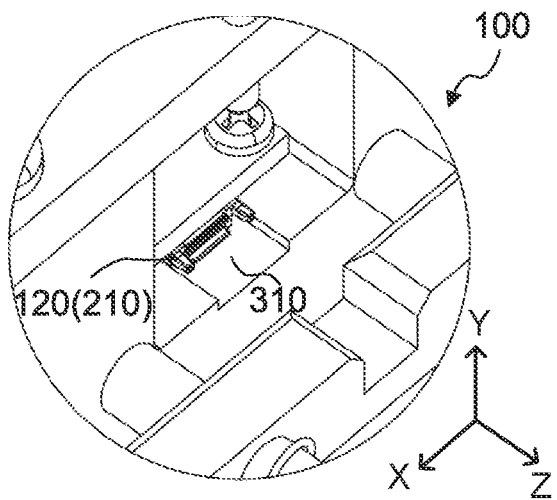
FIGS. 9A to 9E illustrate how the optical connector is produced by using the production device.
Figure 9B:
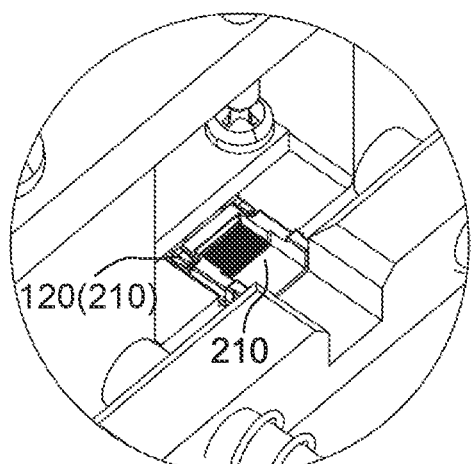

As illustrated in FIG. 9A, production device 100 including fixing part 120 (second ferrule 210) is prepared. As illustrated in FIG. 9B, first ferrule 210 with lid 150 removed is disposed on ferrule supporting part 310. First ferrule 210 is fixed to fixing part 120 by applying a pressing force to the first ferrule with ferrule pressing member 330.

Figure 9C:
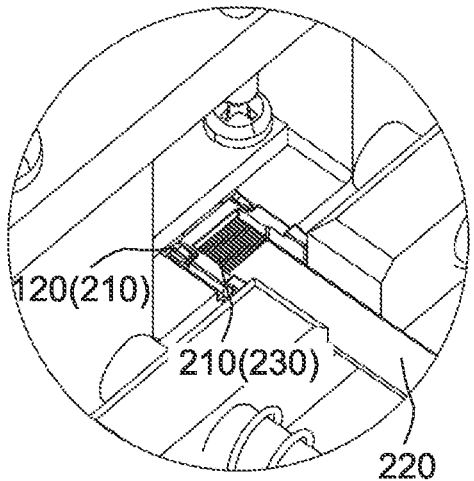

As illustrated in FIG. 9C, the end of first optical transmission members 220 is disposed on first ferrule 210 held by fixing part 120. An adhesive (for example, a UV curable adhesive) is then applied from above optical transmission member holding part 230 of first ferrule 210.

Figure 9D:
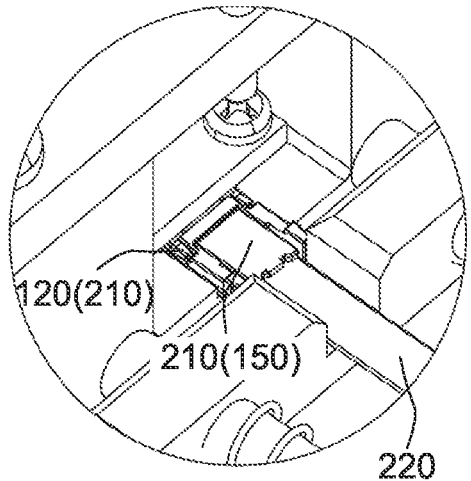
Figure 9E:
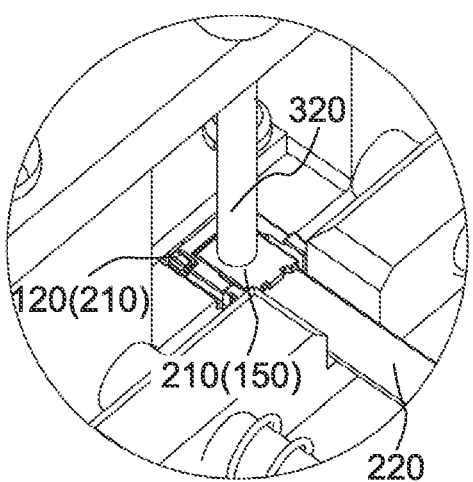

As illustrated in FIG. 9D, lid 150 is placed on the end of first optical transmission members 220 disposed on first ferrule 210. As illustrated in FIG. 9E, lid pressing member 320 then presses lid 150.

The present embodiment describes the following (see FIG. 1A): one of light emitting device 10 and light receiving device 20 is disposed at the other end of first optical transmission members 220 whose one end is disposed at first ferrule 210; and the other one of light emitting device 10 and light receiving device 20 is disposed at the other end of second optical transmission members 140 whose one end is disposed at fixing part 120 (second ferrule 210). Such a configuration allows evaluation of whether or not first optical transmission members 220 are optically and properly coupled with second optical transmission members 220 by emitting light from light emitting device 10 and detecting the light transmitted through the first optical transmission members and the second optical transmission members, by using light receiving device 20. Specifically, evaluating whether or not the optical transmission members are optically and properly coupled can evaluate the position of the end of first optical transmission members 220 in first ferrule 210.

When the position of the end of first optical transmission members 220 is evaluated as appropriate, first optical transmission members 220 can be fixed to first ferrule 210 by, for example, irradiating the UV curable adhesive with UV from above to cure the adhesive. In the present embodiment, first ferrule 210 is held in fixing part 120 by fitting the fitting structure disposed at the front surface of the first ferrule with the fixing part. As a result, nothing that would block the UV is on the top surface or the back surface of first ferrule 210, and the UV curable adhesive can be easily cured.

On the other hand, when the position of the end of first optical transmission members 220 is evaluated as inappropriate, first optical transmission members 220 can be reattached and the position of the end of first optical transmission members 220 can be evaluated again.

Effect

According to the optical connector production device of the present invention and the method which is for producing an optical connector and which uses the optical connector production device, first ferrule 210 where first optical transmission member 220 is disposed can be held by fitting. First ferrule 210 thus can be easily and reliably held without, for example, denting first ferrule 210. In the present embodiment, first ferrule 210 or a component having a similar structure serves as fixing part 120, and second optical transmission member transmission member 140 is connected to fixing part 120. The position of the end of first optical transmission member 220 in first ferrule 210 thus can be evaluated with first optical transmission member 220 disposed in first ferrule 210. Therefore, whether or not to fix first optical transmission member 220 to first ferrule 210 with an adhesive or the like can be decided after the evaluation. The yield of producing the optical connector thus can be improved.

INDUSTRIAL APPLICABILITY

The optical connector production device and the method for producing an optical connector according to the present invention are particularly advantageous for producing optical connectors including ferrules and optical transmission members.

REFERENCE SIGNS LIST

10 Light emitting device
20 Light receiving device
100 Production device
120 Fixing part
140 Second optical transmission member
150 Lid
200 Optical connector
210 First ferrule (second ferrule)
220 First optical transmission member
230 Optical transmission member holding part
231 Groove
240 First optical surface
250 Light transmitting wall
260 Second optical surface
270 Engaging protrusion
271 Inward restricting surface
280 Engaging recess
281 Outward restricting surface
290 Protrusion
300 Recess
310 Ferrule supporting part
320 Lid pressing member
330 Ferrule pressing member
340 Base

The invention claimed is:

1. A method for producing an optical connector, using an optical connector production device, wherein
the optical connector includes a first ferrule and a first optical transmission member
the optical connector production device comprises:
a jig body; and
a fixing part for allowing the first ferrule to fit thereto to hold the first ferrule, the fixing part being disposed in the jig body,
the method comprises:
fitting the first ferrule to the fixing part; and
disposing one end of the first optical transmission member on the first ferrule fitted to the fixing part.

2. The method according to claim 1, wherein
the optical connector production device further comprises a light emitting device and a light receiving device for evaluating optical coupling of the first optical transmission member disposed at the first ferrule, the method further comprises:
optically connecting one of the light emitting device or the light receiving device to another end of the first optical transmission member including the one end disposed on the first ferrule; and
evaluating positional accuracy of the one end of the first optical transmission member in the first ferrule by detecting light emitted from the light emitting device and transmitted through the first optical transmission member and a second optical transmission member, the detecting being performed by using the light receiving device.

3. The method according to claim 2, further comprising, after the evaluating, fixing the one end of the first optical transmission member to the first ferrule.

4. The method according to claim 3, wherein the fixing includes curing a UV curable adhesive by UV irradiation, the UV curable adhesive being previously adhered to the one end of the first optical transmission member, the one end being held by the first ferrule.

* * * * *